United States Patent [19]

Remus et al.

[11] Patent Number: 4,920,414
[45] Date of Patent: Apr. 24, 1990

[54] DIGITAL VIDEO SIGNAL ENCODING ARRANGEMENT, AND CORRESPONDING DECODING ARRANGEMENT

[75] Inventors: Christian Remus, Joinville-le-Pont; Olivier Chantelou, Paris, both of France

[73] Assignee: U.S. Philips Corporation, New York, N.Y.

[21] Appl. No.: 250,019

[22] Filed: Sep. 27, 1988

[30] Foreign Application Priority Data

Sep. 29, 1987 [FR] France .................. 87 13429

[51] Int. Cl.$^5$ .................. H04N 7/12; H04N 11/06
[52] U.S. Cl. .................. 358/133; 368/135; 368/12; 382/56; 375/25
[58] Field of Search .......... 358/133, 135, 136, 11, 358/12, 21 R; 382/56; 375/25, 34

[56] References Cited

U.S. PATENT DOCUMENTS

| 4,394,774 | 7/1983 | Widergren et al. | 358/136 |
| 4,541,012 | 9/1985 | Tescher | 358/135 |
| 4,707,738 | 11/1987 | Ferre et al. | 358/135 |
| 4,774,587 | 9/1988 | Schmitt | 358/133 |
| 4,780,761 | 10/1988 | Daly et al. | 358/133 |
| 4,797,742 | 1/1989 | Sujiyama et al. | 358/135 |

Primary Examiner—John K. Peng

[57] ABSTRACT

A digital video signal encoding arrangement comprising a correlation reducing circuit receiving said digital signals which are representative of the luminance or the chrominance of a certain number of elements of a picture which has been divided into blocks, a scanning conversion circuit (30), a normalization circuit (50), a quantizing circuit (60), a circuit (70) for encoding said quantized values and a rate controlling circuit (80). This arrangement is characterized in that its normalization circuit itself comprises: (a) a weighting coefficient storage memory (51) which is addressed on the one hand by an index i indicating the position in the current block, and on the other hand by a value representative of the activity of this block; (b) a standard calculating circuit (52) on the basis of a mean standard value produced by the rate controlling circuit and also on the weighting coefficient supplied; (c) a circuit (59) for dividing by the coefficient $K_i$ the output of said standard calculating circuit.

6 Claims, 5 Drawing Sheets

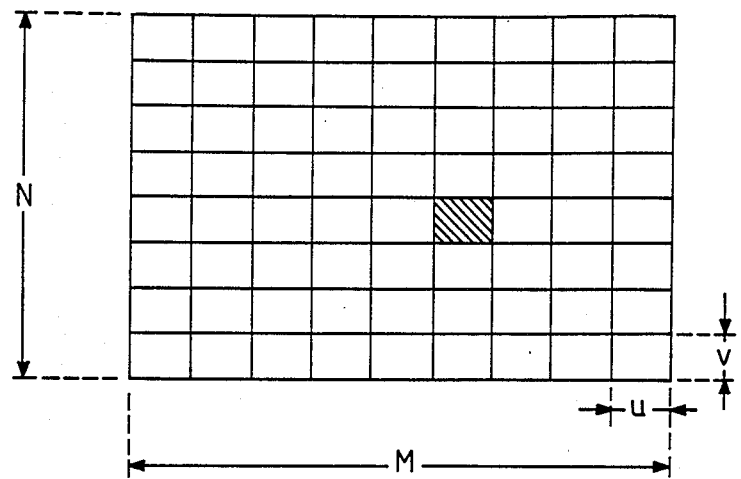
FIG. 2a
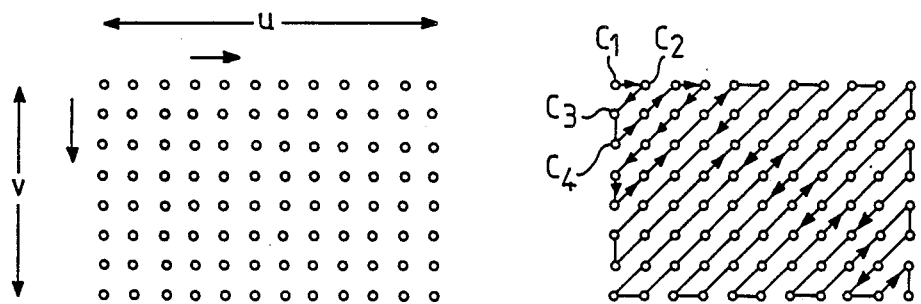
FIG. 2b
FIG. 2c

DIGITAL VIDEO SIGNAL ENCODING ARRANGEMENT, AND CORRESPONDING DECODING ARRANGEMENT

The present invention relates to a digital video signal encoding arrangement, comprising a correlation reducing circuit receiving said digital signals which are representative of the luminance or the chrominance of a certain number of elements of a picture which has been divided into blocks, a scanning conversion circuit transforming the bidimensional sequence of the values of the output coefficients $F_i(u,v)$ of the correlation reducing circuit into a monodimensional sequence, a normalization circuit, a quantizing circuit which converts each normalized output value of the normalization circuit into an integral value, a circuit for encoding said quantized values, a rate controlling circuit receiving in accordance with a variable rate said encoded values and, on the one hand, returns to the normalized circuit a mean standard value which is linked to said rate, and, on the other hand, supplies encoded values at a constant rate from the output of the encoding arrangement, a delay circuit being optionally provided between said correlation reducing circuits and the scanning conversion circuits and a compression circuit being optionally provided between said scanning conversion circuit and the normalization circuit. The invention also relates to a decoding arrangement corresponding to such an encoding arrangement.

Digitizing television signals in view of their transmission or storage, is an extremely useful solution for the case of links in which the interference noise is particularly high, for example in satellite links. A television picture contains however a large number of information components whose digital representation implies a high rate. By sampling the components of the television signal at a rate which satisfies the Shannon condition and by effecting a uniform quantization in 256 levels, the direct digitizing of the luminance and chrominance components at frequencies of 13.5 and 6.75 MHz, respectively, imposed by the standards, will actually result in a rate of 216 Meb/s. This rate is absolutely prohibitive, more specifically for commercially available magnetic storage devices. The use of rate reducing techniques is therefore necessary, and this technique is the more easy to realise the higher the redundancy in the picture.

The U.S. Pat. No. 4,394,774 describes an example of a data compression arrangement which realises an encoding of video signals by orthogonal transformation. This encoding is obtained by cutting each image into blocks of a predetermined shape, by applying thereafter said orthogonal transformation to each block. The coefficients obtained from this transformation are then divided by a normalisation factor, and thereafter quantized and coded. However, such an arrangement does not take account of the actual characteristics of each block, more specifically the activity of these blocks. The influence of the encoding method used is such, for example, that it introduces amplitude faults at the countours which are very different according to the position of the contours in the block.

The invention has for its object to provide a video signal encoding arrangement which obviates this type of disadvantage.

To that end, the invention relates to an arrangement which is characterized in that said normalisation circuit itself comprises:

(a) a memory for storing the weighting coefficients, which on the one hand is addressed by the index i indicating the position of each value $F_i(u,v)$ of the current block, available at a first input line of the normalization circuit and, on the other hand by a value which is representative of the activity of the current block, available at a second input line;

(b) a circuit for calculating the standard on the basis of, on the one hand, said mean standard value supplied by the rate controlling circuit and, on the other hand, of the weighting coefficient supplied by said storage memory of the normalization circuit;

(c) a circuit for dividing the output of the compression circuit or, if the latter is not present, of the output of the scanning conversion circuit by the coefficient $K_i$ corresponding to the output of said standard calculating circuit.

The proposed structure actually also remedies the imperfections and distortions produced by the encoding operation, more specifically because it provides a classification of each transformed block in accordance with a classification criterion which takes the nature of the content of a block to be encoded into account. This criterion may, for example, be a comparison of the maximum of the absolute value of the coefficients of this block (d. c. components excepted) and a certain number of thresholds. Satisfactory trials have been made with, in particular, four classes and three value thresholds fixed at 10, 25 and 50 for a dynamics of the digital samples comprised between 0 and 256.

Such a classification adequately reduces the visibility of detected faults (the visibility of block structures in quasi-uniform zones and considerable noise levels along the contours). The visibility of the structure of the blocks can be still further reduced in the uniform zones: it is possible to reduce the quantization steps in blocks of this types (which are substantially uniform) and to increase this quantization step in those blocks containing high amplitude coefficients or to modify the quantization step as a function of the position of the coefficient, by reducing it for blocks of low activity for an appropriate recovery of the low-frequency coefficients, whilst for blocks of higher contrasts, an appropriate recovery implies a rather fine quantization of the high spatial frequencies.

The invention thus proposed, by differentiating the processing operations as a function of the nature of the content of the blocks to be encoded, permits of taking account of not only the objective activity measures, but also of the correlations established between these objective criteria and the psycho-visual criteria.

Particulars of the invention and how it can be put into effect will become more apparent from the following description given by way of non-limitative example with reference to the accompanying drawings, and in which:

FIG. 1 shows an embodiment of the encoding arrangement according to the invention;

FIG. 2a shows a picture divided into N ×M blocks, FIG. 2b is the bidimensional matrix of the transformation coefficients of one of these picture blocks, FIG. 2c shows a type of monodimensional paths for reading and processing said coefficients, FIG. 2d shows a further type of path for a block of 32 picture elements and FIG. 2e shows, relative to FIG. 2c, a variant of the paths in which the coefficients are sequentially read in different blocks;

Figure 1:
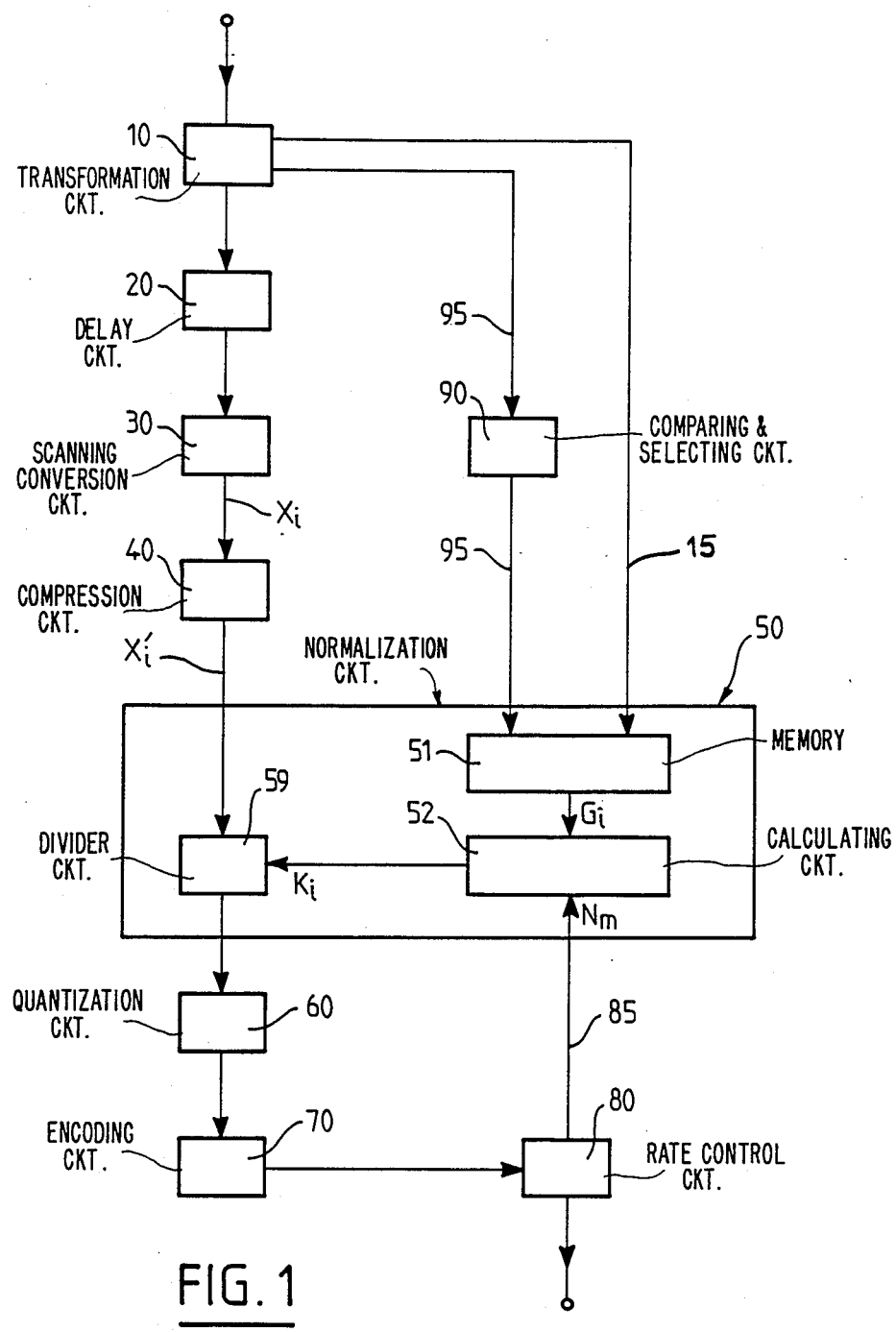

In the embodiment shown in FIG. 1, the arrangement according to the invention includes first of all a circuit 10 for a transformation into a discrete cosine. This circuit 10 receives a sequence of digital signals which in the form of a matrix represents the values of the luminance or the chrominance of a given number of points or elements of a picture divided into blocks, and for each block produces a bidimensional sequence of coefficients $F_i(u,v)$. FIG. 2a shows such a picture, divided into M×N blocks. The transformation into a discrete cosine is a known operation, and the expression of the transformation coefficients obtained sequentially for each block will therefore not be given here. It should only be noted that numerous statistic measurements have shown the very strong correlation between adjacent points of a field or a picture, and that the object of the transformation is to obtain a set of coefficients which are more uncorrelated than the values available before transformation.

The values $F_i(u,v)$ are then applied, via a delay circuit 20, to a scanning conversion circuit 30 which has for its object to convert the bidimensional sequence of the values $F_i(u,v)$ into a monodimensional sequence. For a block such as the block shown in FIG. 2b, which itself corresponds to the hatched block in FIG 2a, this monodimensional sequence can for example be a zig-zag sequence as the one indicated in FIG. 2c which shows, in a representation of the bidimensional matrix of the transformation coefficients of the picture block, a type of path defining the reading ($C_1, C_2, C_3, \ldots$ etc. ....) and processing order of these coefficients. This type of path has the following advantage: it allows, after the quantization operation provided furtheron, to meet long ranges of zero values, which contributes to reducing the quantity of information to be transmitted. This monodimensional sequence could however be constituted on the basis of another criterion, for example in accordance with the type of path shown in FIG. 2d for a block of $u \times v = 32$ picture elements, or it may be of a different type than those shown, they can for example be determined in an adaptive manner as a function of the characteristics measured on the signal itself. It is equally possible to effect reading of the coefficients in different blocks, for example a sequential lecture in each of the four spatially adjacent blocks of FIG. 2e, by reading the coefficients $C_1, C_2, C_3, C_4$, thereafter the coefficients $C_5, C_6$, etc ... and so forth in the type of path adapted.

Figure 3:
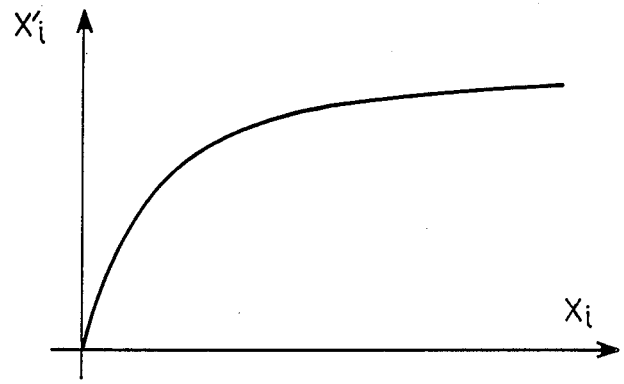
FIG. 3 is a curve $X'_i = f(X_i)$ corresponding to the compression operation realised after the scanning conversion.

A compression circuit 40 then receives this monodimensional sequence, which is, for example, designated $X_i$, to produce a new sequence of monodimensional $X'_i$, the sequence of $X'_i$ being obtained from $X_i$ in accordance with a transformation curve such as the one shown in FIG. 3. In the sequel of this description the existence of a quantization operation is described: if this quantization operation is affected with a variable step, the compression circuit 40 can be omitted. If, in contrast therewith the quantization is a linear quantization, the presence of the compression circuit permits of roughly recovering a variable-step transformation. This systematic compression is, in either of these cases justified by the fact that the eye is more sensitive to the distortions which affect the low amplitude values than those affecting the high amplitude values.

Without the necessity for the quantization to be adaptive, it is in any case important to note, as will be described in greater detail hereinafter, that such an adaptive character is advantageous. It actually allows the modification of the quantization step in accordance with the more or less uniform nature of the picture, or picture blocks, and also exercises on the encoding operation, a more rudimentary quantization which renders the use of shorter codewords and consequently a great reduction necessary.

Figure 2D:
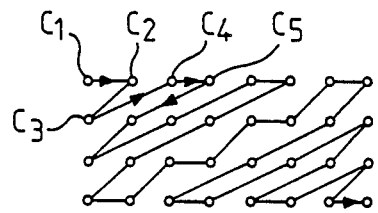
Figure 2E:
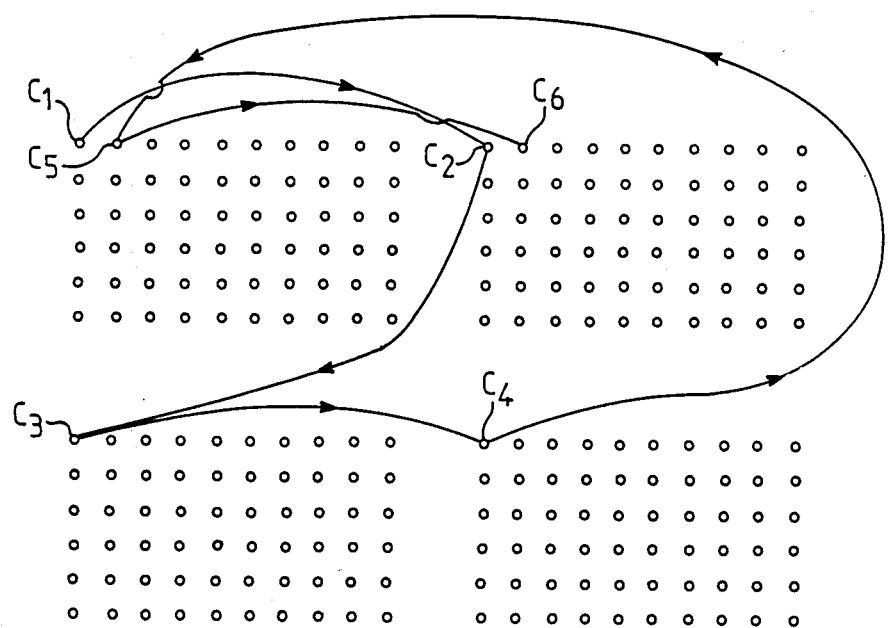

At the output of the compression circuit 40, or of the scanning conversion circuit 30, when the circuit 40 is omitted, a normalization circuit 50 is thereafter provided. As is indicated in FIG. 1, this normalization circuit 50 comprises a divider circuit 59 for dividing the output of the compression circuit 40 or the output of the scanning conversion circuit 30, by a predetermined parameter $K_i$ as indicated hereinafter. This parameter $K_i$ is assumed to depend on the one hand on the position, in the current block, of the coefficient which is available at the "dividing" input of the divider circuit 59, that is to say on the coefficient obtained once during the scanning conversion effected to have a monodimensional sequence available. This is justified by the fact that the essential visual information components of a picture correspond to the lowest spatial frequencies, which themselves correspond to the first coefficients of the bidimensional matrix of the transformation coefficients, when this matrix is read, processed in accordance with a path of the type as shown in FIG. 2c or in FIG. 2d. This parameter $K_i$ depends on the other hand on the mean standard $N_m$ of the block, that is to say on the fill rate of the control memory which, as indicated hereinafter, has been provided in the rate controlling circuit which constitutes the final element of the encoding arrangement according to the invention.

Moreover, any encoder which operates on blocks generally introduces two types of distortions. The first type, denoted streaking, occurs in quasi-uniform zones in which the variations in the brightness are extremely progressive. After coding, in these zones sudden changes in the brightness are observed from block to block whose visual effect is very annoying. The second type results from encoding noise components which are outside the passband of the contours and which distort these contours, whilst the noise components situated in the spectral band of the contours are masked by said contours.

It is therefore important to reduce the visibility of these two types of distortions by adapting the quantization of the coefficients of each block according to whether the block under consideration is uniform or quasi-uniform or, on the contrary contains contours of a greater or less strong contrast, that is to say in accordance with what is denoted the class of activity of the block.

The parameter $K_i$ is therefore considered as being dependent on the class of activity of the current block, which stresses the importance of the mean luminance attached to the considered block. There are several possibilities to define the class. The activity criterion adopted here is to search in a block the expression max $F_i(u,v)$, wherein $i=2$ to $(u \times v)$, $F_i(u,v)$ being the value of the coefficient of the order i, after transformation into discrete cosine and scanning conversion, and $(u \times v)$ being the total number of coefficients of the block. The first coefficient is excluded from this search. This coefficient which is located at the head of the matrix of coefficients of each block is actually encoded in a particular manner (for example linear quantization followed by nine-bit coding) to prevent the differences in luminance for one block to another being perceived by the eye. But other criteria to define the activity might be used, for example the value of the sum of squared coefficients.

The position in the current block is supplied by the index i which is added to each coefficient and is applied to the circuit 50 via a connection 15 coming from the output of the direct cosine transformation circuit 10. The mean standard in the current block, which is a value which is higher according as the control memory is fuller, is applied to the circuit 50 via a connection 85 coming from the output of said control memory.

The activity class, in the example described and shown here, is obtained by comparing, to thresholds, of the absolute value of the coefficients (the first coefficient excepted). In the present case, three thresholds and consequently four activity classes are used. The comparison is affected in a class determining circuit 90 which is provided at the output of the discrete cosine transformation circuit 10 and is connected to the circuit 50 via a connection 95. The thresholds provided in the circuit 90 have previously been determined, for example either with the aid of subjective tests, as a function of the classification one thinks preferable for a certain number of reference pictures, or by imposing an equal distribution of the blocks in the different classes, the lowest activity then corresponding to the case in which the block under consideration is substantially uniform, or has low-contrast contours.

Figure 4:
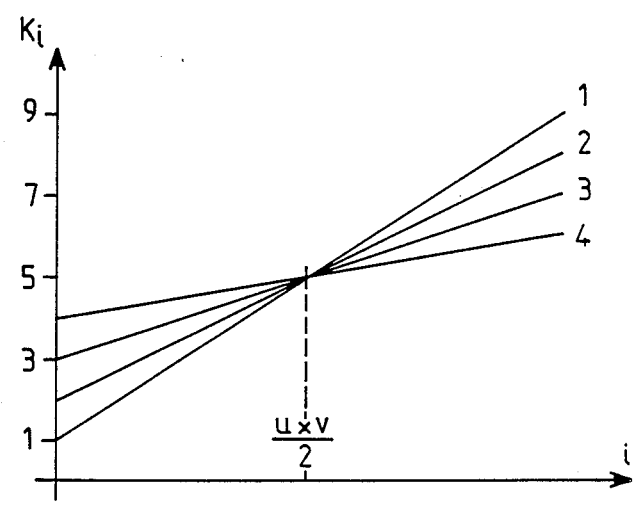
FIG. 4 shows an example of varying the normalization coefficient (and consequently the quantization step) as a function of the position of the coefficients and for different classes.

As a function of the class thus defined in the position in the block provided by the index i, a memory 51 of the circuit 50 supplies a coefficient $G_i$ which is conveyed towards a standard calculating circuit 52. With the aid of this coefficient $G_i$ this circuit 52 weights the value of the mean standard $N_m$ applied via the connection 85 and finally supplies the parameter $K_i$ which is conveyed to the "dividing" input of the divider circuit 59. This weighting operation contributes towards reducing the distortions mentioned in the foregoing, which are caused by encoding in blocks, to a very low extent. It actually renders it possible to have, in accordance with the class, the slope of the curve varied which as a function of the order of the coefficient supplies the normalization parameter $K_i$, and consequently the quantization step. FIG. 4 shows an example of these curves, for the case in which there are four classes denoted 1 to 4 in an order of increasing activity, and the following two facts can be established. On the one hand for low-activity blocks, the low frequencies are given preference, which enables a significant reduction of the visibility of the streaking effect. On the other hand for blocks of higher activities through which contours pass, the high frequencies get an importance which must not be disregarded and, by quantizing the total set of coefficients in a more uniform manner, an excessive high loss of resolution is avoided.

The normalization circuit 50 is followed by a quantization circuit 60. The quantization operation is intended, as is known, to convert the normalized value of each coefficient, expressed with a floating point, into an integral value, either by a simple rounding-off operation, or preferably by truncation, by taking the entire portion of the value before quantization. It will be obvious that, submitted to such a quantization, a certain number of values comprised between 0 and 1 are replaced by the value 0, which decreases the number of significant coefficients to be transmitted and consequently is equivalent to a compression of the data searched for. Such a quantization circuit is known and will therefore not be described in greater detail. It should only be noted, as mentioned in the foregoing, that the quantization may be linear or it may alternatively be a variable-step quantization.

The output of the quantizing circuit 60 is then conveyed, in known manner to an encoding circuit 70, which here comprises Tables of values encoded in accordance with a Huffman code, for encoding either the values of the coefficients (encoding with variable length) or the length of ranges (encoding by ranges). The output of the encoding circuit 70 is finally connected to the input of a rate control circuit 80 which then receives, in accordance with a variable rate, the values thus encoded and recovers them at its principal output at a constant rate. This principal output constitutes the output of the encoding arrangement of the invention. An auxiliary output of the rate control circuit conveyes to the normalization circuit 50, via the return line 85, the value of the mean standard $N_m$ used to compose the value of the overall normalization parameter (the parameter $K_i$) by which the output of the compression circuit 40 (or of the scanning conversion circuit when this circuit 40 is omitted) is divided.

It should be noted that the present invention is not limited to the embodiment described and shown above, on the basis of which variations can be proposed, without departing from the scope of the invention. More specifically it will be obvious that the invention is not limited by the shape (square or rectangular more specifically) or by the dimensions of the blocks into which the picture is divided. However, since the correlation between adjacent elements of a picture (or of a field) decreases when the distance between these elements increases, it is sensible to effect the cosine transformation, in circuit 10, on blocks of reduced dimensions, for example blocks of $8 \times 4$ as the block shown in FIG. 2d. This choice results moreover in a much finer variation of the normalization parameter as a function of the activity of the blocks.

It should also be noted that the transformation in discrete cosine to which the digital input signals are submitted is not the only possible transformation, although it is one of the transformations which result in better performances of the decoding arrangement. Other transformations, such as, for example, the Hadamard transformation or the Slant transformation, also lead, in a similar way, to a reduction in the correlation of the signals, the coefficients obtained being more independent than the values which were available before transformation.

Figure 5:
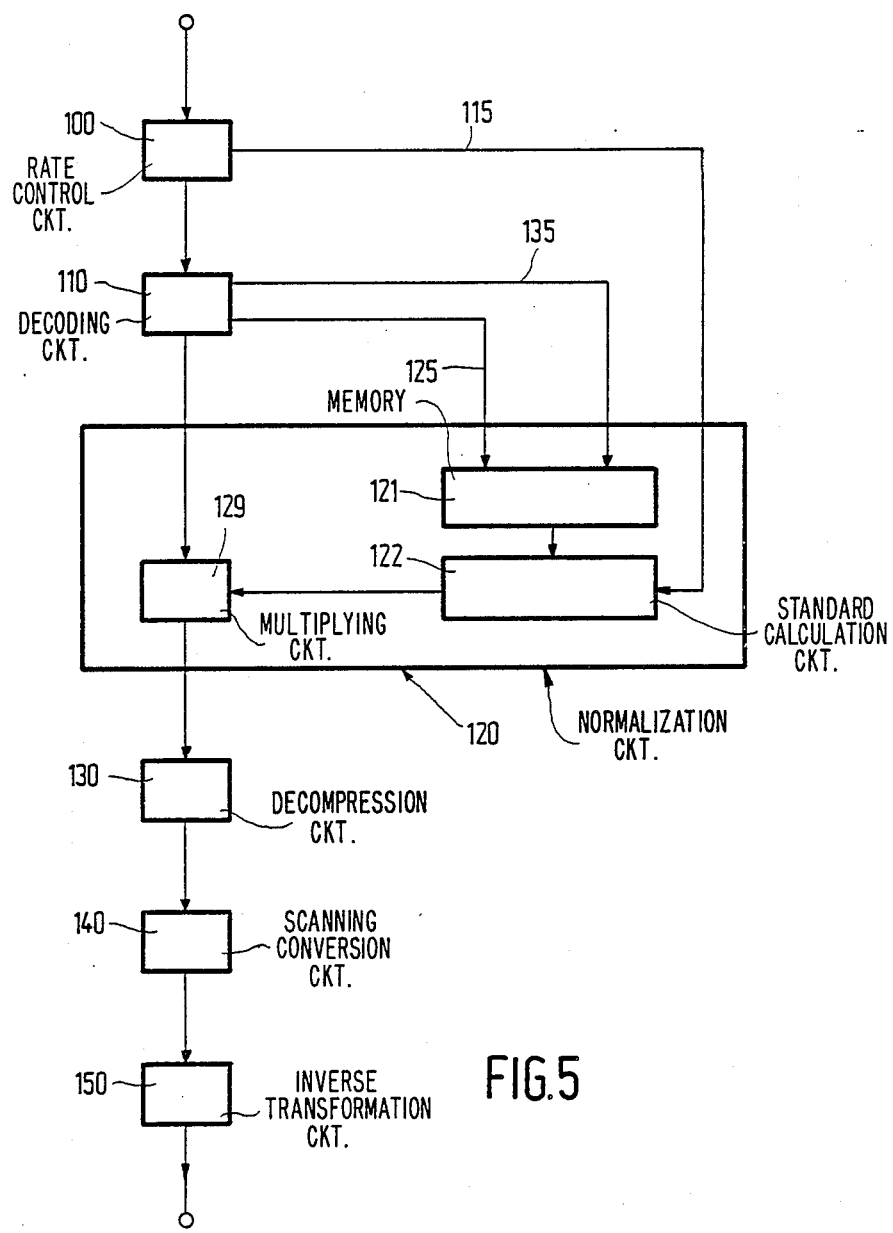
FIG. 5 shows an embodiment of the decoding arrangement associated with the encoding arrangement of FIG. 1.

Moreover, the invention also relates to the decoding arrangement by means of which the operations opposite to those described in the foregoing can be effected on reception of digital video signals which were subjected to such an encoding operation. In the embodiment of FIG. 5 the decoding arrangement has at its input a rate control circuit 100 which in accordance with the rate of the channel receives the binary elements conveyed by the encoding arrangement and recovers them at its principal output at a variable rate. This principal output is connected to a decoding circuit 110 which, in the absence of errors on the channel, reliably recovers the information components which on transmission were offered to the input of the encoding circuit. An auxiliary output 115 of the circuit 100 supplies as a function of the degree to which it is filled, the value of the mean standard Nm utilised to reassemble the value of the overall normalization parameter Ki.

So as to obtain, in a normalization circuit 120, a perfect inverse normalization, that is to say a behavior which is symmetrical relative to the behavior of the encoding arrangement, this parameter is calculated not only as a function of Nm but also as a function of the position of the coefficient and of the class to which the block belongs. The class is transmitted over the line and is supplied from an auxiliary output 125 of the decoding circuit 110. The position in the current block is available at a further auxiliary output 135 of the same decoding circuit 110.

In a similarly manner as on encoding, as a function of the class and the position in the block provided by the index i, a memory 121 of the normalization circuit 120 produces a coefficient Gi which is conveyed towards a standard calculation circuit 122. With the aid of this coefficient this circuit weights the value of the mean standard Nm applied via the connection 115 and finally supplies the parameter Ki which is conveyed not only to a divider circuit but also to a multiplying circuit 129.

The output of the normalization circuit 120 is thereafter optionally decompressed in a circuit 130. This decompression is symmetrical to the compression operation effected in the circuit 40 and does not occur when the circuit 40 was present in the encoding arrangement, that is to say when the quantization effected was a non-linear quantization. The values obtained are then applied to a scanning conversion circuit 140 which has for its object to convert the monodimensional frequency of values into a bidimensional sequence $F'_i(u,v)$, thereafter an inverse transformation circuit 150 allows the recovery of blocks of picture elements, said transformation being opposite to the transformation effected in the encoding arrangement by the correlation reducing circuit.

What is claimed is:

1. A digital video signal encoding arrangement, comprising a correlation reducing circuit (10) receiving said digital signals which are representative of the luminance or the chrominance of a certain number of elements of a picture which has been divided into blocks, a scanning conversion circuit (30) transforming the bidimensional sequence of the values of the output coefficients $F_i(u,v)$ of the correlation reducing circuit (10) into a monodimensional sequence, a normalization circuit (50), a quantizing circuit (60) which converts each normalized output value of the normalization circuit into an integral value, a circuit (70) for encoding said quantized values, a rate controlling circuit (80) receiving in accordance with the variable rate said encoded values and, on the one hand, returns to the normalization circuit (50) a mean standard value $N_m$ which is linked to said rate and, on the other hand, supplies encoded values at a constant rate from the output of the encoding arrangement, characterized in that the normalization circuit itself comprises:
   (a) a memory (51) for storing the weighting coefficients, which on the one hand is addressed by the index i indicating the position of each value $F_i(u,v)$ of the current block, available at a first input line (15) of the normalization circuit (50) and on the other hand by a value which is representative of the activity of the current block, available at a second input line (95);
   (b) a circuit (52) for calculating the standard $K_i$ on the basis of, on the one hand, said mean standard value $N_m$ supplied by the rate controlling circuit and, on the other hand, of the weighting coefficient supplied by said storage memory of the normalization circuit;
   (c) a circuit (59) for dividing the output of the scanning conversion circuit by the coefficient $K_i$ corresponding to the output of said standard calculating circuit.

2. An arrangement as claimed in claim 1, characterized in that the index i for addressing the weighting coefficient storage memory (51) is supplied directly by the correlation reducing circuit (10) and in that the value which is representative of the activity of the current block is also supplied by this same circuit but via a class determining circuit (90) arranged in series between said correlation reducing circuit and said storage memory.

3. An arrangement as claimed in claim 2, characterized in that the class determining circuit (90) comprises means for comparing a value which is representative of the current block and has (n−1) separate thresholds and selection means for selecting from n separate class values, in accordance with the result of said (n−1) comparison, wherein n is at least 4.

4. An arrangement as claimed in claim 3, characterized in that said value representative of the current block is the absolute value of the highest of the coefficients $F_i(u,v)$ of this current block, the first coefficient $F(0,0)$ of said block being excluded from this operation of selecting a value representative of the block.

5. An arrangement as claimed in claim 3, characterized in that said value which is representative of the current block is the value of the sum of the square coefficients $F_i(u,v)$, the first coefficient $F(0,0)$ of this block being excluded from this operation of selecting a value representative of the block.

6. An arrangement for decoding digital video signals which were submitted to an encoding operation in an encoding arrangement as claimed in any one of the claims 1 to 5, said decoding arrangement comprising, arranged in series, a second rate controlling circuit (100), a decoding circuit (110), a normalization circuit (120), a scanning conversion circuit (140), and a transformation circuit (150) effecting the inverse of the operation effected by said correlation reducing circuit, characterized in that the normalization circuit (120) itself comprises:
   (a) a second weighting coefficient storage memory (121) which is addressed on the one hand by the index i of the position of the current block, available at a first input line (125) of the normalisation circuit (120), and on the other hand by a value which is representative of the activity of the current block, available at a second input line (135);
   (b) a second circuit (122) for calculating the standard $K_i$ on the basis of the value of the mean standard $N_m$ produced by the second rate controlling circuit and also the weighting coefficient produced by said second storage memory;
   (c) a circuit (129) for multiplying the output of the decoding circuit (110) by the corresponding output coefficient $K_i$ of said second standard calculating circuit.

* * * * *